(12) United States Patent
Uhl

(10) Patent No.: US 9,161,018 B2
(45) Date of Patent: Oct. 13, 2015

(54) METHODS AND SYSTEMS FOR SYNTHESIZING STEREOSCOPIC IMAGES

(71) Applicant: Christopher L. Uhl, Delmar, NY (US)

(72) Inventor: Christopher L. Uhl, Delmar, NY (US)

( * ) Notice: Subject to any disclaimer, the term of this patent is extended or adjusted under 35 U.S.C. 154(b) by 378 days.

(21) Appl. No.: 13/661,844

(22) Filed: Oct. 26, 2012

(65) Prior Publication Data

US 2014/0118506 A1    May 1, 2014

(51) Int. Cl.
*H04N 13/02*    (2006.01)

(52) U.S. Cl.
CPC .................................. *H04N 13/026* (2013.01)

(58) Field of Classification Search
None
See application file for complete search history.

(56) References Cited

U.S. PATENT DOCUMENTS

| | | | |
|---|---|---|---|
| 4,131,342 A | 12/1978 | Dudley | |
| 4,705,371 A | 11/1987 | Beard | |
| 4,836,647 A | 6/1989 | Beard | |
| 4,893,898 A | 1/1990 | Beard | |
| 5,193,000 A | 3/1993 | Lipton et al. | |
| 5,282,029 A | 1/1994 | Lawrence et al. | |
| 5,510,832 A | 4/1996 | Garcia | |
| 5,541,642 A | 7/1996 | Ashbey | |
| 5,745,164 A | 4/1998 | Faris | |
| 6,144,440 A | 11/2000 | Osgood | |
| 7,030,902 B2 | 4/2006 | Jacobs | |
| RE39,342 E | 10/2006 | Starks et al. | |
| 7,385,625 B2 | 6/2008 | Ohmura et al. | |
| 8,029,139 B2 | 10/2011 | Ellinger et al. | |
| 8,152,303 B2 | 4/2012 | DeCusatis et al. | |
| 2010/0020160 A1* | 1/2010 | Ashbey ........................... | 348/43 |
| 2010/0086199 A1* | 4/2010 | Kim et al. ...................... | 382/154 |
| 2011/0157168 A1* | 6/2011 | Bennett et al. ................ | 345/419 |
| 2012/0013711 A1* | 1/2012 | Tamir et al. .................... | 348/46 |
| 2012/0050856 A1* | 3/2012 | Shintani ........................ | 359/464 |
| 2012/0127282 A1* | 5/2012 | Hwangbo ....................... | 348/51 |
| 2012/0169843 A1* | 7/2012 | Luthra et al. ................... | 348/43 |

FOREIGN PATENT DOCUMENTS

| | | |
|---|---|---|
| WO | WO9013848 A1 | 11/1990 |
| WO | WO9203021 A1 | 2/1992 |

OTHER PUBLICATIONS

Wikipedia—"Pulfrich Effect" [http://en.wikipedia.org/wiki/Pulfrich_effect], last updated: Aug. 23, 2012.
rainbowsymphony.com—"Pulfrich Effect Glasses," [http://www.rainbowsymphony.com/3d-pulfrich-glasses.html], 2000.
stereoscopy.com—"Pulfrich Effect" [http://www.stereoscopy.com/faq/pulfricheffect.html], 2005.

* cited by examiner

*Primary Examiner* — Jay Patel
*Assistant Examiner* — Reza Aghevli
(74) *Attorney, Agent, or Firm* — Tech Valley Patent, LLC; John Pietrangelo

(57) ABSTRACT

Systems and methods are provided for synthesizing stereoscopic [that is, "3-D"] images from 2-D images, for example, 2-D video or 2-D still images. The method includes capturing a series of images exhibiting at least some relative movement to provide a first series of images; generating a second series of temporally modified images from the first series of images by varying the relative timing of at least some of the images of the first series of images; and displaying the first series of images with at least some of the second series of temporally modified images to produce a series of stereoscopic images. The stereoscopic images may then be viewed with appropriate stereoscopic devices, for example, 3-D glasses. Methods and systems for capturing the images whereby the stereoscopic appearance of the images is enhanced are also disclosed.

9 Claims, 7 Drawing Sheets

METHODS AND SYSTEMS FOR SYNTHESIZING STEREOSCOPIC IMAGES

BACKGROUND OF THE INVENTION

1. Technical Field

The present invention generally relates to stereoscopic (that is, "3-D") image generation. More particularly, the present invention relates to the creation of stereoscopic images from 2-dimensional images by manipulating the 2-dimensional images and displaying the manipulated images for viewing in 3-D.

2. Description of Related Art

Stereoscopic Imaging

Stereoscopic imaging (that is, 3-dimensional or "3-D" imaging) is a common procedure to enhance the viewing experience of motion pictures, television, and amusement park presentations, and the like, by producing a depth dimension to 2-dimensional video images. In addition to entertainment, stereoscopic imaging can also be used to enhance education, aid the surgeon or the fighter pilot, and generally provide a more enhanced means of relaying information and data.

Typically, the dimension of depth by humans, and other animals, is perceived when viewing a scene through our two eyes, which are typically laterally spaced apart from each other. It is generally understood that the brain processes the difference between what each eye sees and interprets the difference as depth. For example, objects which are closer to the observer will have a greater difference in the images seen with each eye than objects which are further away from the observer because of a greater angle discrepancy (that is, the "depth cues") of the close objects compared to the distant ones. In contrast, when viewing with a single eye, or when filming or recording images with a single camera, these visual differences and the 3-D experience are lost, and, when displayed, the video field appears flat.

According to the prevailing prior art, video which is intended to portray a third dimension ("3-D") during viewing or playback is typically recorded using two substantially identical cameras spaced some distance apart to simulate the "depth cues" normally interpreted by the human eye. More recently, much more labor intensive processes of isolating individual objects and/or subjects in video frames and applying "depth cues" to the isolated objects and/or subjects have been used to convert existing 2-dimensional ("2-D") video into 3-D video. For example, these processes typically require that individual images be isolated and the desired 3-D effect generated by extracting, typically, electronically, the desired elements from each image and manipulating, for example, moving elements forward or backward in the image, to produce the desired 3-D effect. When videos employing these depth cues are played back, some means of assuring that each of the viewer's eyes receives the image intended for that eye is used. However, such existing systems are recognizably cumbersome and the creating and displaying of 3-D images by such processes are labor intensive.

There have been many attempts of varying success and public acceptance at generating stereoscopic video. Numerous prior art systems and methods are disclosed in U.S. Pat. Nos. 4,131,342; 4,836,647; 5,282,029; 5,510,832; 5,745,164; 6,144,440; 7,030,902; 7,385,625; and RE 39,342; in published PCT applications WO9013848A1, WO9203021A1, and WO9211735A1, and in published EP application EP315019, among others. However, again, these and other prior art systems and methods are typically characterized by the complexity and labor intensity of other prior art systems and methods.

Accordingly, a need exists for providing systems and methods for providing stereoscopic imagery that, among other things, simplifies the process where it can be more accessible to video editors and like professionals.

The Pulfrich Effect

Aspects of the present invention are inspired by what is known in the art as "the Pulfrich Effect." As understood in the art, the Pulfrich Effect is a neuropsychological phenomenon in which lateral movement of a subject or object is interpreted by the human brain as a depth dimension. This phenomenon is typically associated with the difference in the timing of the presentation of images to human eyes. The Pulfrich Effect is often illustrated or displayed with the use of a dark lens over one eye that effectively delays the reception of the image by that eye compared to the unshielded eye. The brain interprets this delay in reception by the retina of each eye as a 3-D image. Illustrative demonstrations of this phenomenon are available, for example, on the Internet.

Recognizing the potential implications of this Pulfrich Effect upon the generation of stereoscopic images, the present inventor investigated and developed aspects of the present invention. Surprisingly, aspects of the present invention provide an effective means for generating stereoscopic images. Aspects of the present invention do not employ the Pulfrich Effect; aspects of the present were inspired by the Pulfrich effect to provide systems and methods for providing stereoscopic images.

SUMMARY OF THE INVENTION

The present invention in its several embodiments and numerous aspects overcomes the cumbersome, labor-intensive, and time-consuming methods and systems of the prior art. The present invention provides systems and methods for producing stereoscopic images, and also provides systems and methods of capturing images, which can enhance the stereoscopic appearance of the images and video produced.

One embodiment of the invention is a method for synthesizing a series of stereoscopic [that is, "3-D"] images from a series of images, the series of images exhibiting at least some relative movement, the method comprising or including capturing a series of images exhibiting at least some relative movement to provide a first series of images; generating a second series of temporally modified images from the first series of images by varying a relative timing of at least some of the images of the first series of images; and displaying the first series of images and the second series of temporally modified images to produce a series of stereoscopic images. In one aspect, the images of the first series of images may be "monocular" images, that is, images displaying subjects and/or objects as would be seen with one eye in two dimensions, with little or no 3-dimensional effect. In another aspect, more than one image may be generated in a fashion similar to the second series of temporally modified images, for example, 2 or more series of images, or 3 or more series of images, may be generated and then displayed or combined with the first series of images according aspects of the invention.

In one aspect of the invention, varying the relative timing of at least some of the first series of the images may comprise delaying the timing of the first series of images. For example, in one aspect, delaying at least some frames of the first series of images may be practiced by delaying the relative timing of at least some of the first series images. In another aspect, varying the relative timing of at least some of the first series of images may be practiced by advancing the timing of at least some of the first series of images. For example, in one aspect, advancing the relative timing of at least some of the first series images may be practiced by advancing at least some frames of the first series images.

In another aspect of the invention, the step of displaying may be practiced by rapidly displaying the series of stereoscopic images wherein the series of stereoscopic images can be viewed by a human observer employing a stereoscopic image-handling device, for example, by means of a pair of stereoscopic glasses.

Another embodiment of the invention is a system for synthesizing a series of stereoscopic images from a series of images, for example, monocular images, the series of images exhibiting at least some relative movement, the system comprising or including an image-capturing device adapted for capturing a series of images exhibiting at least some relative movement to provide a first series of images; means for generating a second series of temporally modified images from the first series of images by varying a relative timing of at least some of the images of the first series of images; and a display adapted to display the first series of images and the second series of temporally modified images to display a series of stereoscopic images. In one aspect, the means for generating the second series of temporally modified images from the first series of images may be a processor having a program adapted to vary the relative timing of at least some of the images of the first series of images. The display may be a display adapted to rapidly display the series of stereoscopic images. The systems may also include a stereoscopic image-handling device adapted to allow viewing of the stereoscopic images by a human observer, for example, a pair stereoscopic [that is, "3-D"] glasses. Again, in one aspect, more than one image may be generated in a fashion similar to the second series of temporally modified images, for example, 2 or more series of images, or 3 or more series of images, may be generated and then displayed or combined with the first series of images according aspects of the invention.

A further embodiment of the invention is a method for producing stereoscopic images comprising or including providing a moveable image-capturing device positioned to capture images of a subject in a field of view of the image-capturing device; capturing a series of images having the subject with the moveable image-capturing device to provide a first series of images; generating a second series of temporally modified images from the first series of images by varying a relative timing of at least some of the images of the first series of images; displaying the first series of images and the second series of temporally modified images to produce a series of stereoscopic images exhibiting at least some stereoscopic appearance; and varying a position of the moveable image-capturing device relative to the subject to vary the at least some stereoscopic appearance of the series of stereoscopic images. According to aspects of the invention, a "stereoscopic appearance" comprises an appearance exhibiting at least some relative depth and/or difference in position when viewed by an observer, for example, when processed by the neuropsychological interpretation mechanisms of the brain, for instance, when viewed through 3-D glasses. According to one aspect of the invention, "varying the stereoscopic appearance" may comprise varying the appearance of the relative depth and/or position of a subject or object when viewed by an observer, for instance, when viewed through 3-D glasses.

In one aspect, moving the image-capturing device closer to the subject may be practiced by varying the position of the moveable image-capturing device relative to the subject. In one aspect, the subject may be a moving subject. In another aspect, varying the position of the moveable image-capturing device relative to the subject comprises moving the image-capturing device, moving the subject, or both. In another aspect, the method further comprises detecting the position and/or speed of the image-capturing device, the subject, or both; and wherein generating the second series of temporally modified images from the first series of images by varying the relative timing of at least some of the images of the first series of images comprises varying the relative timing as a function of the detected position and/or speed and of the image-capturing device, the subject, or both. For example, detecting may comprise sensing the output of position and/or speed of one or more sensors adapted to detect the position and/or speed of the image-capturing device, the subject, or both.

Again, in one aspect, varying the relative timing of at least some of the first series of images may comprise delaying the timing of the first series of images, for example, delaying at least some frames of the first series images. In another aspect, varying the relative timing of at least some of the first series of images may comprise advancing the timing of at least some of the first series of images, for example, advancing at least some frames of the first series images.

A still further embodiment of the invention is a system for producing stereoscopic images comprising or including an image-capturing device, for example, a movable image-capturing device, positioned to capture a first series of images of a subject in a field of view of the image-capturing device; means for generating a second series of temporally modified images from the first series of images by varying a relative timing of at least some of the images of the first series of images; a display adapted to display the first series of images and the second series of temporally modified images to display a series of stereoscopic images exhibiting at least some stereoscopic appearance; and means for varying a position of the image-capturing device relative to the subject to vary the at least some stereoscopic appearance of the series of stereoscopic images. The means for generating the second series of temporally modified images from the first series of images may comprise a processor having a program adapted to vary the relative timing of at least some of the images of the first series of images. The display, for example, a monitor, may be adapted to rapidly display the series of stereoscopic images. The system may also include a stereoscopic image-handling device, for example, a pair of stereoscopic glasses, adapted to allow viewing of the stereoscopic images by a human observer.

These and other aspects, features, and advantages of this invention will become apparent from the following detailed description of the various embodiments of the invention and the numerous aspects of the embodiments of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be readily understood from the following detailed description of the embodiments of the invention taken in conjunction with the accompanying drawings in which:

DETAILED DESCRIPTION OF THE INVENTION

Figure 1:
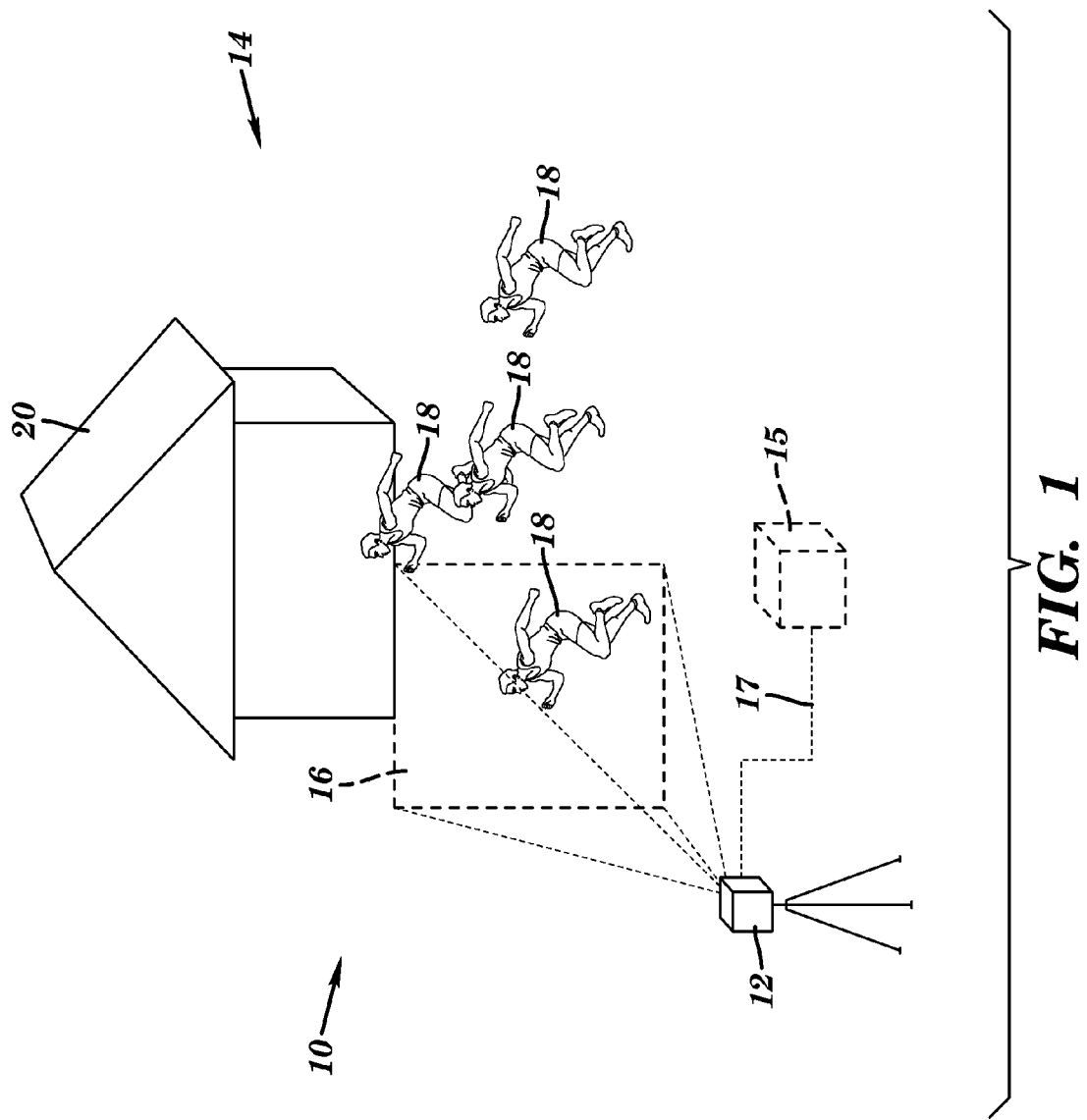
FIG. 1 is a schematic illustration of one arrangement for employing aspects of the invention.

FIG. 1 is a schematic illustration of one arrangement 10 for employing aspects of the present invention. As shown in FIG. 1, arrangement 10 includes an image-capturing device 12, for example, a video camera, adapted to record a series of images of a scene 14, where the image-capturing device 12 defines a field of view 16. The scene 14 in the field of view 16 may typically have one or more subjects 18, which may be in motion, and may include one or more structures, backgrounds, or backdrops 20, for example, a building, as shown, or a landscape, positioned behind or distal the subjects 18, for example, distal to image-capturing device 12. In the aspect shown in FIG. 1, the subjects 18 are shown as sprinters, though any animate or inanimate subject, stationary or non-stationary, may be captured or imaged according to aspects of the invention. Arrangement 10 may also include a image storage and/or manipulation device 15 (shown in phantom in FIG. 1), for example, a computer or data processor, which is operatively connected to image-capturing device 12 by cable 17 or wirelessly. In one aspect, image-capturing device 12 may be adapted to provide image storage and/or manipulation.

Figure 2:
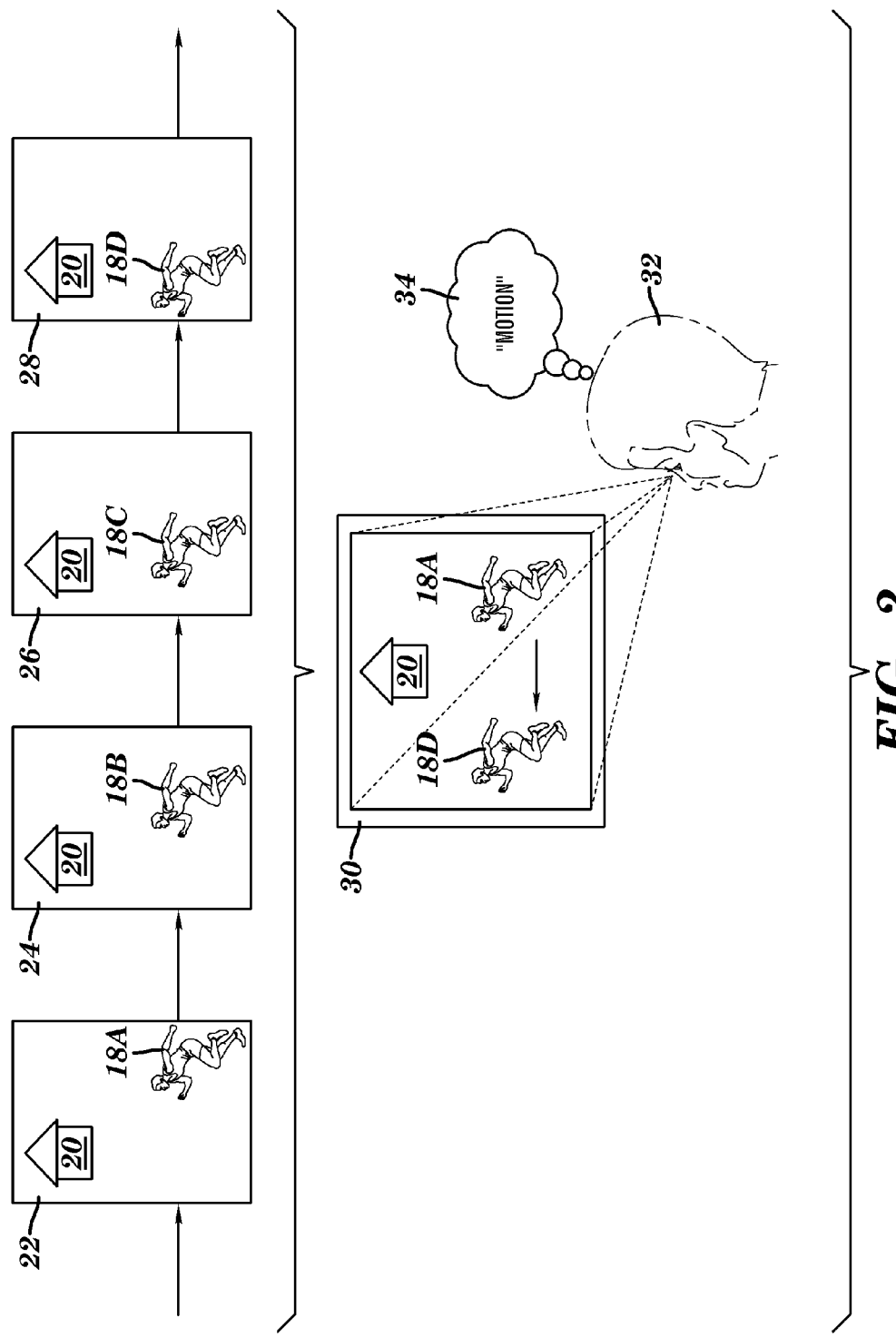
FIG. 2 is a schematic illustration of a prior art mechanism for viewing and interpreting motion picture images of which the present invention is an improvement.

As previously discussed, aspects of the present invention, such as the arrangement 10 shown in FIG. 1, provide methods and systems for synthesizing stereoscopic (that is, "3-D") images. The scope of the present invention can be better understood in comparison to the conventional methods of capturing and displaying a dynamic image, such as, scene 14 in FIG. 1. FIG. 2 is a schematic illustration of a prior art mechanism for viewing and interpreting motion picture images that can be useful in understanding the present invention.

As shown in FIG. 2, in conventional motion picture capturing and displaying or projection, an image-capturing device, such as, image-capturing device 12 shown in FIG. 1, is adapted to record a series of images at a predetermined rate of speed, that is, at a "frame rate," for example, 24 frames per second [fps] or 30 fps. Accordingly, as shown in FIG. 2, image-capturing device 12 may record a series of sequential images or frames 22, 24, 26, and 28 as one subject 18 progresses across the field of view 16 of capturing device 12 shown in FIG. 1. Also shown in images 22, 24, 26, and 28 is the distal structure or backdrop 20 which may be present in the field of view 16 of device 12. Though structure or backdrop 20 may be moving, as shown in FIG. 2, structure or backdrop 20 is stationary relative to subject 18 and/or image-capturing device 12; therefore, structure or backdrop 20 exhibits little or no relative movement or translation in images 22, 24, 26, and 28. As shown in FIG. 2, to facilitate discussion of aspects of the invention, subject 18 is designated subject 18A, 18B, 18C, and 18D in images or frames 22, 24, 26, and 28, respectively. As is known in the art, when images 22, 24, 26, and 28 are sequentially rapidly displayed (for example, at the frame rate at which the images were captured) as indicated by display 30 in FIG. 2, due to a human observer 32, due to the well-known neuropsychological phenomenon referred to as the "persistence of vision," the observer 32 does not see the display as interrupted images but as a continuous display of motion. This continuous display of motion is represented by the sequential images 18A, 18B, 18C, and 18D on display 30. Accordingly, observer 32 typically interprets the sequential display 30 as substantially continuous motion 34. Also, as shown in display 30, the motion of the structure or backdrop 20 may exhibit little or no motion due to the stationary and/or distal position of structure or backdrop 20. With this brief, cursory background of conventional motion picture production, it is believed that aspects of the invention shown in FIG. 3 will be more readily understood.

Figure 3:
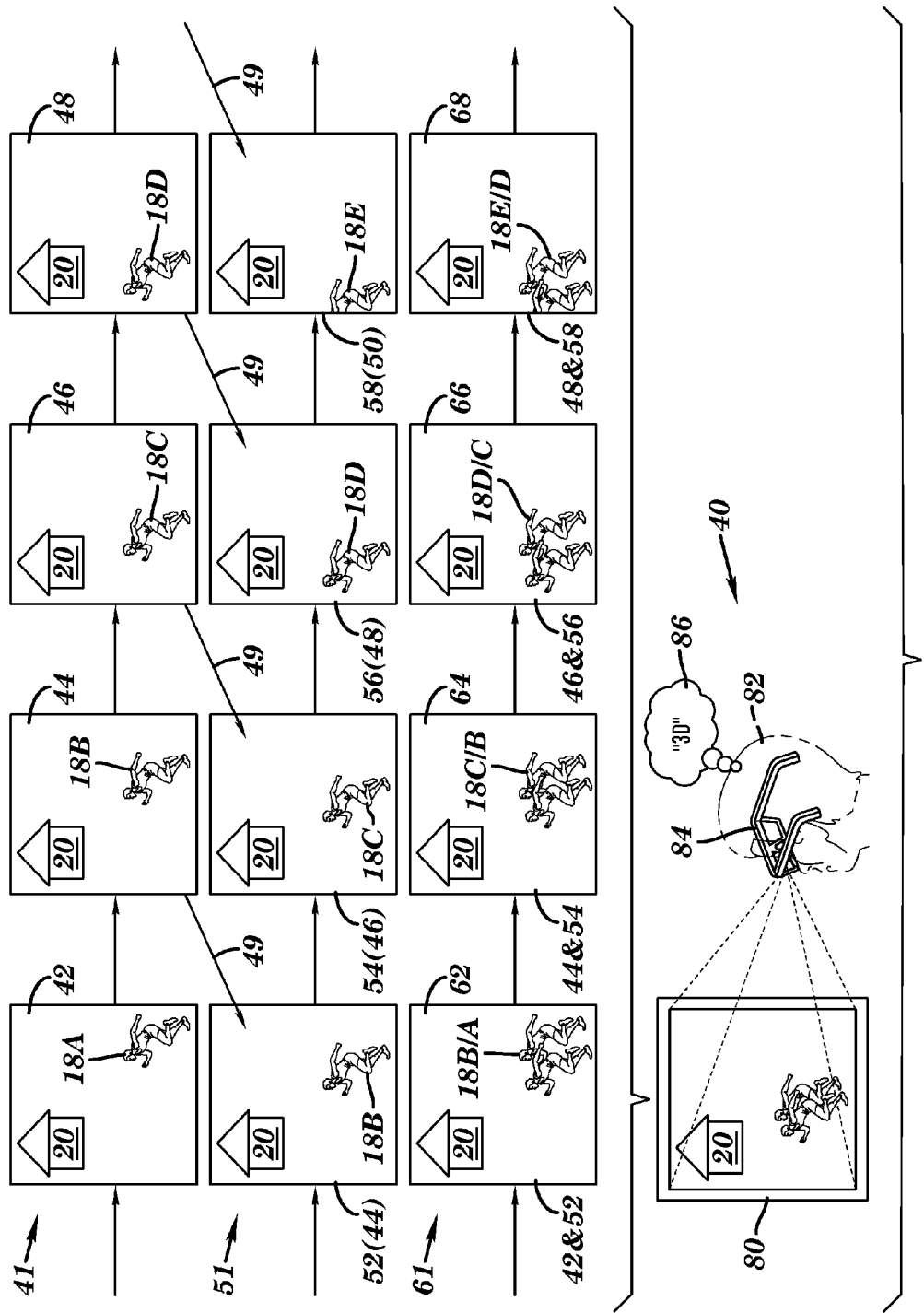
FIG. 3 is a schematic diagram of procedures for generating and viewing stereoscopic images according to one aspect of the present invention.

FIG. 3 is a schematic diagram 40 of procedures for generating and viewing stereoscopic images according to one aspect of the present invention. Diagram 40 includes series 41 of sequential images or frames 42, 44, 46, 48, 50 (not shown), etc. taken or captured, for example, by an image-capturing device, for example, a single image-capturing device 12 shown in FIG. 1. The series 41 of images may comprise film, for example, analog film; digital pictures; and/or analog or digital video. Typically, the series 41 of images is captured or recorded at a predetermined frame rate and may contain a subject (that is, an animate or and inanimate subject), such as, subject 18 in FIG. 1, as subject 18 progresses across a field of view, for example, field of view 16 in FIG. 1. In a fashion similar to the designations shown in FIG. 2, in FIG. 3, to facilitate discussion of aspects of the invention, subject 18 is designated subject 18A, 18B, 18C, 18D, and 18E in images or frames 42, 44, 46, 48, and 50 (not shown), respectively. As expected, due to the relative motion of subject 18, for example, the lateral motion of subject 18, subjects 18A, 18B, 18C, and 18D will be displaced in the field of vision and in images 42 44, 46, 48, 50 (not shown), etc. It will be understood by those of skill in the art that the relative displacement of subjects 18A 18B, 18C, 18D, etc. will be a function of the speed of relative movement of subject 18 and the frame rate of the image-capturing device 12, among other things.

As shown in FIG. 3, in images 42, 44, 46, 48, 50 (not shown), etc. a distal structure or backdrop, such as, structure 20 shown in FIG. 1 may be present in the field of view and appear in images 42, 44, 46, 48, 50 (not shown), etc. Again, though structure or backdrop 20 may be moving, in the aspect shown in FIG. 3, structure or backdrop 20 is stationary, and, therefore, structure or backdrop 20 may exhibit little or no relative movement or translation in images 42, 44, 46, 48, 50 (not shown), etc. According to one aspect of the invention, images or frames 42, 44, 46, 48, 50 (not shown), etc. may be considered substantially to be 2-D or "monocular" images, that is, images exhibiting little or no stereoscopic properties.

According to aspects of the invention, after first recording or capturing the series 41 of images, a second series 51 of images are generated or produced by temporally modifying the images from the first series of images 41. This temporal modification of the first series of images 41 may be practiced by varying the relative timing of at least some of the images of the first series 41. According to one aspect, shown by arrows 49 in FIG. 3, a second series 51 of images, specifically, images 52, 54, 56, 58, 60 (not shown), etc. may be produced by "advancing" the relative timing of at least some of the images 42, 44, 46, 48, 50 (not shown), etc. in the first series 41 of images, for example, by advancing at least some frames of the first series 41 to create the second series 51 of images.

According to one aspect of the invention, the relative positioning of the images in series 51 relative to series 41 may be a function of the direction of motion of the subject 18. For example, with respect to the right-to-left motion exhibited by subject 18, 18A, 18B, etc. in FIGS. 1 and 3, series 51 may be generated by advancing series 41 from right to left, as indicated by arrows 49. However, when the direction of movement of subject 18, 18, 18A, 18B, etc. is directed from left-to-right, series 51 may be generated by "delaying" series 41 from left to right, that is, opposite the direction of arrows 49.

In one aspect of the invention, the series 41 of images are temporally modified, that is, the relative timing of the images is modified, to produce the second series 51. In particular, in one aspect, the series 51 of images may be temporally modified only. Contrary to prior art methods, the series 41 of images are not substantially spatially modified in any way, that is, there is no distortion or modification of the dimensions or appearance of the series 41 of images in producing series 51 of images. It is to be understood that some inconsequential spatial modification may occur according to aspects of the invention, for example, due to image handling or manipulation errors, but in one aspect, it is preferred that little or no spatial modification be present. Prior art methods that spatially modify the images also typically inherently vary the spatial relationship between, for example, subjects and their background, and are thus prone to cause blurring and otherwise unsatisfactory results.

According to aspects of the invention, objects or subjects that are in motion, for example, subject 18, 18A, 18B, etc., will appear to be in different positions when comparing the original stream or series 41 to the modified or advanced (or delayed) stream or series 51. Furthermore, the faster the subject 18 is moving, the greater the difference in position will be from frame to frame in each series 41 and 51. In addition, according to one aspect of the invention, the greater the advancement (or delay), the greater the difference in position of, for example, the subject 18B in image 52 in series 51 compared to the original or as-captured image 18A in image 42 of series 41.

According to aspects of the invention, after generating the second series 51 of images 52, 54, 56, 58, 60 (not shown), etc., the individual images in the first series 41 are displayed or combined with at least some of the images from the second series 51 to generate or produce a series of images 61 on a display 80. According to aspects of the invention, images 61 may comprise "stereoscopic" images, that is images that when sequentially displayed, for example, rapidly displayed, on a display 80 and viewed by an observer 82 with an appropriate stereoscopic image handling device 84, such as, a pair stereoscopic [that is, "3-D"] glasses, are interpreted by the viewer 82 as having at least some depth or "3-dimensional" quality 86.

As shown in FIG. 3, the series 61 of, for example, stereoscopic images displayed on display 80 may comprises images 62, 64, 66, 68, 70 (not shown), etc. Each of the images 62, 64, 66, 68, 70 (not shown), etc. may comprise the combination of images from the first series 41 and the second series 51. Specifically, image 62 may comprise a combination of image 42 from first series 41 and image 52 from second series 51; image 64 may comprise a combination of image 44 from first series 41 and image 54 from second series 51; image 66 may comprise a combination of image 46 from first series 41 and image 56 from second series 51; and image 68 may comprise a combination of image 48 from first series 41 and image 58 from second series 51. It will be understood that further images in series 61 may be generated by displaying previous or subsequent images in series 41 and series 51. According to one aspect of the invention, series 41 of images and series 51 of images are displayed, for example, substantially simultaneously displayed, for instance, upon a monitor or projected upon a surface, in a controlled fashion, for example, wherein stationary objects in each image, for example, structure 20, are co-incident or registered with each other, and exhibit little or, preferably, no distortion or blurring. According to the present invention, as further illustrated in FIG. 5, the series 41 of images is sensed by one eye, for example, the left eye, and the series 51 of images is sensed by the other eye, for example, the right eye, and, due the neuropsychological effect of exposing the human brain to two displaced images, the brain interprets the sensed images as a 3-D image.

According to another aspect of the invention, the series 61 of images may be images produced by combining images from series 41 with images from series 51 of images. For example, in this aspect, this combining of images may comprise the overlaying or introducing of at least part of one image upon at least part of another image. For example, in one aspect, when the images being processed comprise "rasterized" or "pixelated" images, that is, images comprising a field or "raster" of individual picture elements, such as, digital picture elements, or "pixels," combining images may comprise introducing at least some pixels from one image to the raster of pixels in another image. In another aspect of the invention, combining images may comprise introducing substantially all the pixels from the raster of one image to all the pixels of a raster of another image. This digital image processing may typically be practiced using a computer-based algorithm, for example, a specially adapted digital image processing software.

When the images are provided as analog images, combining images may comprise the overlaying or introducing of at least part of one analog image upon at least part of another analog image. In another aspect of the invention, combining images may comprise overlaying or introducing substantially all of one analog image onto or over another analog image. This analog image processing may also typically be practiced using a computer-based algorithm, for example, a specially adapted analog image processing software.

As shown in FIG. 3, the series 61 of images comprises a displaying or combining of at least some of each of the images from series 41 and series 51, but may typically comprise a displaying or combining of substantially all of each of the images from series 41 and series 51. For example, though the displayed image 62 in series 61 may comprise at least some of image 42 from series 41 and at least some of image 52 from series 51, image 62 shown in FIG. 3 may comprise the displaying of the entire image 52 with the entire image 42. In one aspect, when images 42 and 52 are rasterized digital images, image 62 may comprise the addition of all the pixels of image 42 to the raster of all the pixels in image 52 to provide the combined digital image 62.

As shown in FIG. 3, this displaying of images 42 and 52, etc., since the subject 18 is in motion (for example, lateral motion), will typically include the double image of subject 18A from image 42 and subject 18B from image 52 (which is substantially a copy of image 44 from series 41). This double imagining will typically only be viewable without the use of stereographic image handling device, for example, 3-D glass. According to aspects of the invention, when appropriately viewed, for example, with 3-D glasses, the perceived image will comprise a substantially smooth 3-D moving video. This double imaging will also characterize the displaying of images 64, 66, 68, 70 (not shown), etc. that comprise series 61. As will be discussed further with respect to FIG. 5, these double images on image 62, 64, 66, 68, 70 (not shown), etc.

when displayed on display 80 produce the desired stereoscopic effect when viewed by appropriate means.

The images of series 61 in FIG. 3 also exhibit the effect of the displaying of relatively immobile or stationary subjects or subjects located deeper in the field of view of the images, for example, structure 20. As shown in series 41 and 51, since backdrop or structure 20 may typically be stationary (though backdrop or structure 20 may be in relative motion), structure or structures 20 or structures or backdrops similar to structure 20 may exhibit little or no relative movement in the images of series 41 or series 51. Accordingly, according to one aspect of the invention, when the images of series 41 and the images of series 51 are displayed to create the images of series 61, structure 20 and its like structures or backdrops may exhibit little or no relative movement. As a result, as shown in images 62, 64, 66, 68, 70 (not shown), etc., structure 20 may exhibit little or no blurring or double imaging. Furthermore, according to aspects to the invention, subject 20 and its like subjects may exhibit little or no stereoscopic (that is, "3-D") effects when displayed on display 80 and viewed by appropriate means.

The images generated in series 61 in FIG. 3 result from the advancing of images in the stream of captured images in series 41. According to another aspect of the inventing, stereoscopic images can also be generated by delaying images in series 41 to create a delayed image series to be displayed with the captured images of series 41. This aspect of the invention is illustrated in FIG. 4.

Figure 4:
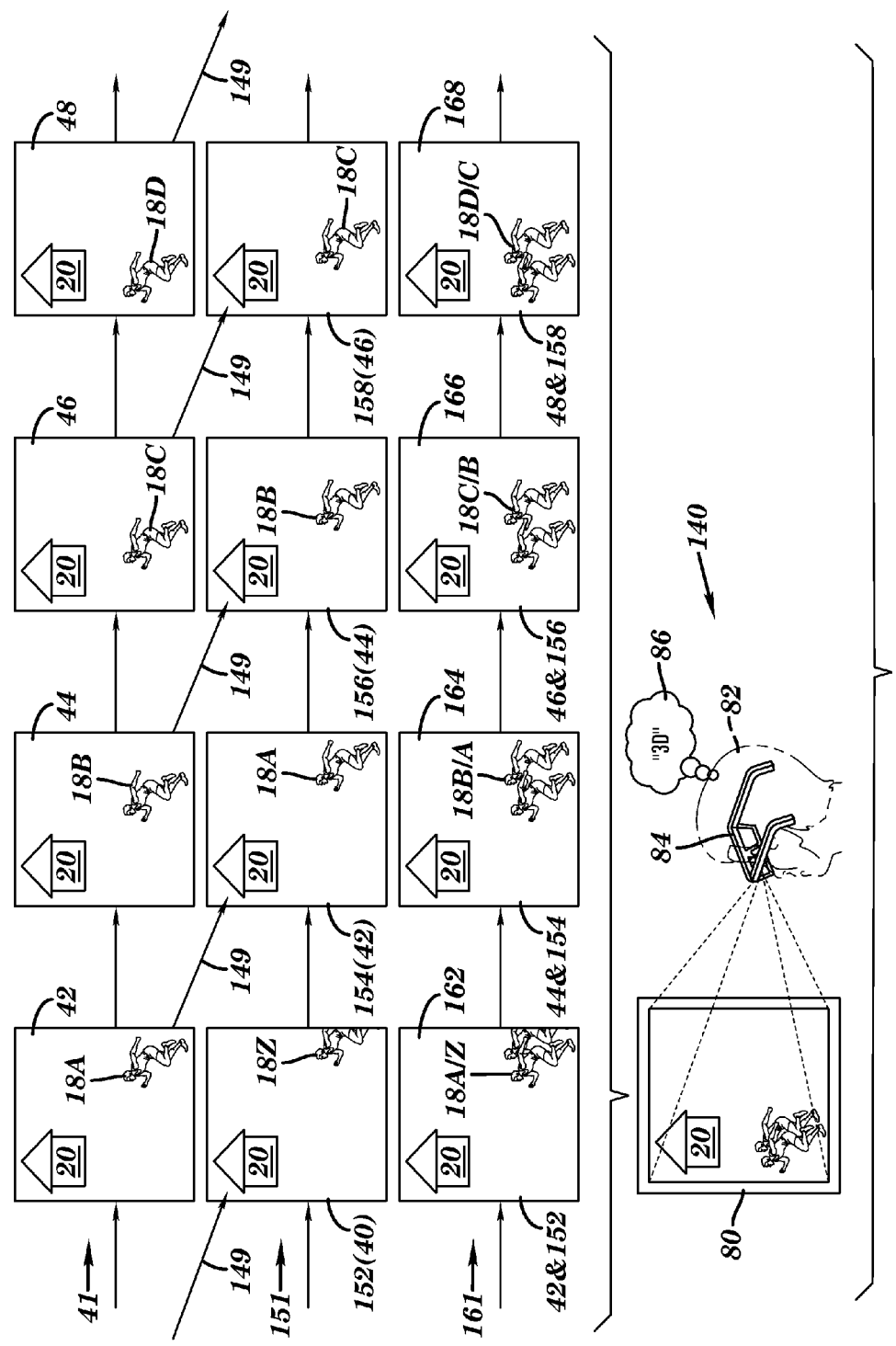
FIG. 4 is a schematic diagram, similar to FIG. 3, of procedures for generating and viewing stereoscopic images according to another aspect of the present invention.

FIG. 4 is a schematic diagram 140 of procedures for generating and displaying stereoscopic images according to another aspect of the present invention. In contrast to diagram 40 shown in FIG. 3, diagram 140 shown in FIG. 4 exhibits an aspect of the invention in which images are "delayed," instead of advanced, and displayed to provide stereoscopic images. Diagram 140 includes series 41 of sequential images or frames 40 (not shown) 42, 44, 46, 48, 50 (not shown), etc. substantially the same as the images of series 41 shown in FIG. 3. That is, the series of images 41 in FIG. 4 may be taken or captured, for example, by an image-capturing device, for example, image-capturing device 12 shown in FIG. 1, at a predetermined frame rate of a subject, such as, subject 18 in FIG. 1, as subject 18 progresses across a field of view, for example, field of view 16 in FIG. 1. As shown in FIG. 4, in images 40 (not shown), 42, 44, 46, 48, 50 (not shown), etc., a distal structure, background, or backdrop 20, such as, structure 20 shown in FIG. 1, may be present in the field of view and appear in images 40 (not shown), 42, 44, 46, 48, 50 (not shown), etc. Again, due to its distal location relative to subject 18 and/or image-capturing device 12, structure or backdrop 20 may exhibit little or no relative movement or translation in images 40 (not shown), 42, 44, 46, 48, 50 (not shown), etc. As shown in FIG. 4, in a fashion similar to the images shown in FIG. 3, subject 18 is designated subject 18Z (not shown), 18A, 18B, 18C, and 18D in images or frames 40 (not shown), 42, 44, 46, 48, 50 (not shown), etc., respectively. According to aspects of the invention, images or frames 42, 44, 46, 48, 50 (not shown), etc. may be 2-D or "monocular" images, that is, images exhibiting little or no stereoscopic properties.

According to this aspect of the invention, after first recording or capturing the series 41 of images, a second series 151 of images are generated or produced by temporally modifying the images from the first series of images 41. This temporal modification of the first series of images 41 may be practiced by varying the relative timing of at least some of the images of the first series 41. According to one aspect, shown by arrows 149 in FIG. 4, a second series 151 of images, specifically, images 152, 154, 156, 158, 160 (not shown), etc. may be produced by "delaying" the relative timing of at least some of the images 40 (not shown), 42, 44, 46, 48, 50 (not shown), etc. in the first series 41 of images, for example, by delaying at least some frames of the first series 41 to create the second series 151 of images.

According to aspects of the invention, after generating the second series 151, the individual images in the first series 41 are displayed or combined with at least some of the images from the second series 151 to produce a series of images 161. As noted with respect to the aspect shown in FIG. 3, according to aspects of the invention, the images in series 161 may comprise "stereoscopic" images, that is, images that when sequentially rapidly displayed on a display 80 and viewed by an observer 82 with an appropriate stereoscopic image handling device 84, such as, a pair stereoscopic glasses, are interpreted by the viewer 82 as having at least some depth or "3-dimensional" quality 86.

As shown in FIG. 4, the series 161 of, for example, stereoscopic images, may comprises images 162, 164, 166, 168, 170 (not shown), etc. Each of the images 162, 164, 166, 168, 170 (not shown), etc. may comprise the display or combination of images from the first series 41 and the second series 151, for example, as shown and described with respect to FIG. 3.

As shown in FIG. 4, the series 161 of images comprises a displaying or combining of at least some of each of the images from series 41 and series 151, but may typically comprise a displaying or combining of substantially all of each of the images from series 41 and series 151, for example, as described with respect to FIG. 3. Also, as described with respect to FIG. 3, the images of series 161 in FIG. 4 may also exhibit the effect of the manipulation of relatively immobile or stationary subjects, or subjects located deeper in the field of view of the images, for example, structure 20.

The aspect of the invention shown in FIG. 4, that is, the "delaying" of the images, may be suitable when the subject, for example, subject 18 in FIG. 1, is stationary and the background or backdrop, such as, backdrop 20 in FIG. 1, is moving relative to the stationary subject. In such a configuration, aspects of the invention may enhance the stereoscopic effect by displacing the background or backdrop further away from, or distal, the subject when viewed stereoscopically by an observer.

The aspects of the invention shown in FIG. 3 and FIG. 4 are illustrative of one aspect of the invention in which only one frame is advanced or delayed, for example, in FIG. 3, image 62 is generated by displaying or combining image 42 with its sequentially subsequent image 44 and then displayed on display 80, or in FIG. 4, image 164 is generated by displaying or combining image 44 with its sequentially previous image 42 and then displayed on display 80. However, according to further aspects of the invention, advancing or delaying more than one image or frame in series 41 may generate series 51/61 and series 151/161. For example, with respect to FIG. 3, series 51 may be generated by advancing 2 or more images in series 41 to produce a series 51 whereby the images in series 61 comprises a series of images comprising images 42 and 46, images 44 and 48, and images 46 and 50 (not shown), etc. With respect to FIG. 4, series 151 may be generated by delaying 2 or more images in series 41 to produce a series 151 whereby the images in series 161 comprise a series of images comprising images 42 and 38 (not shown), images 44 and 40 (not shown), and images 46 and 42, etc. Furthermore, it is envisioned that images may be advanced or delayed 3 or more frames, wherein, when advanced, the images in series 61 in FIG. 3 may comprise images 42 and 48 and images 44 and 50 (not shown), etc., or, when delayed, the images in series 161 in FIG. 4 may comprise images 46 and 40 (not shown), images 48 and 42, and images 50 (not shown) and 44, etc. It is further envisioned that the number of images that may be advanced or delayed may be even greater, for example, 5 or more images or 10 or more images. According to aspects of the invention, the number of images that can be advanced or delayed may only be limited by the clarity of the resulting images, for example, as displayed on display 80. It is understood that at some point, the advancement or delay of the images will detract from the quality of the images displayed.

In addition, according to some aspects of the invention, the delay or advancement of the images may be varied, for example, varied depending upon the nature of the relative movement of subjects or objects, for instance, varied between images in series 51 or 151. In stark contrast, the delay resulting from the shading of a lens used to illustrate the Pulfrich Effect is fixed and cannot be varied without changing the lens. In another aspect, the delay or advancement may even be varied within an individual image in one or more images in a series of images, for example, varied in individual images in series 51 or 151. For example, in one aspect, the delay or advancement between two or more images may be 1 frame while the delay or advancement between two or more other images may be two frames. In addition, in one aspect, an advancement of one or more frames between two or more images in a series of images, for example, series 51 or 151, may be supplemented by a delay of one or more frames in a series of images for the same series, for example, series 51 or 151.

Though this aspect of the invention may not be readily apparent, the capability to either delay or advance the frames in a series of frames or images can effectively be used to reverse the eye receiving the delay depending on the direction of the motion of the subject or object. Contrary to the prior art, this capability to "change the eye" which experiences the "delay" may be relatively easily accomplished by aspects of the invention. In contrast, for example, the eye exposed to the delay resulting from the shading of a lens used to illustrate the Pulfrich Effect is fixed and cannot be changed, for instance, without changing or swapping the lens over the respective eyes.

Figure 5:
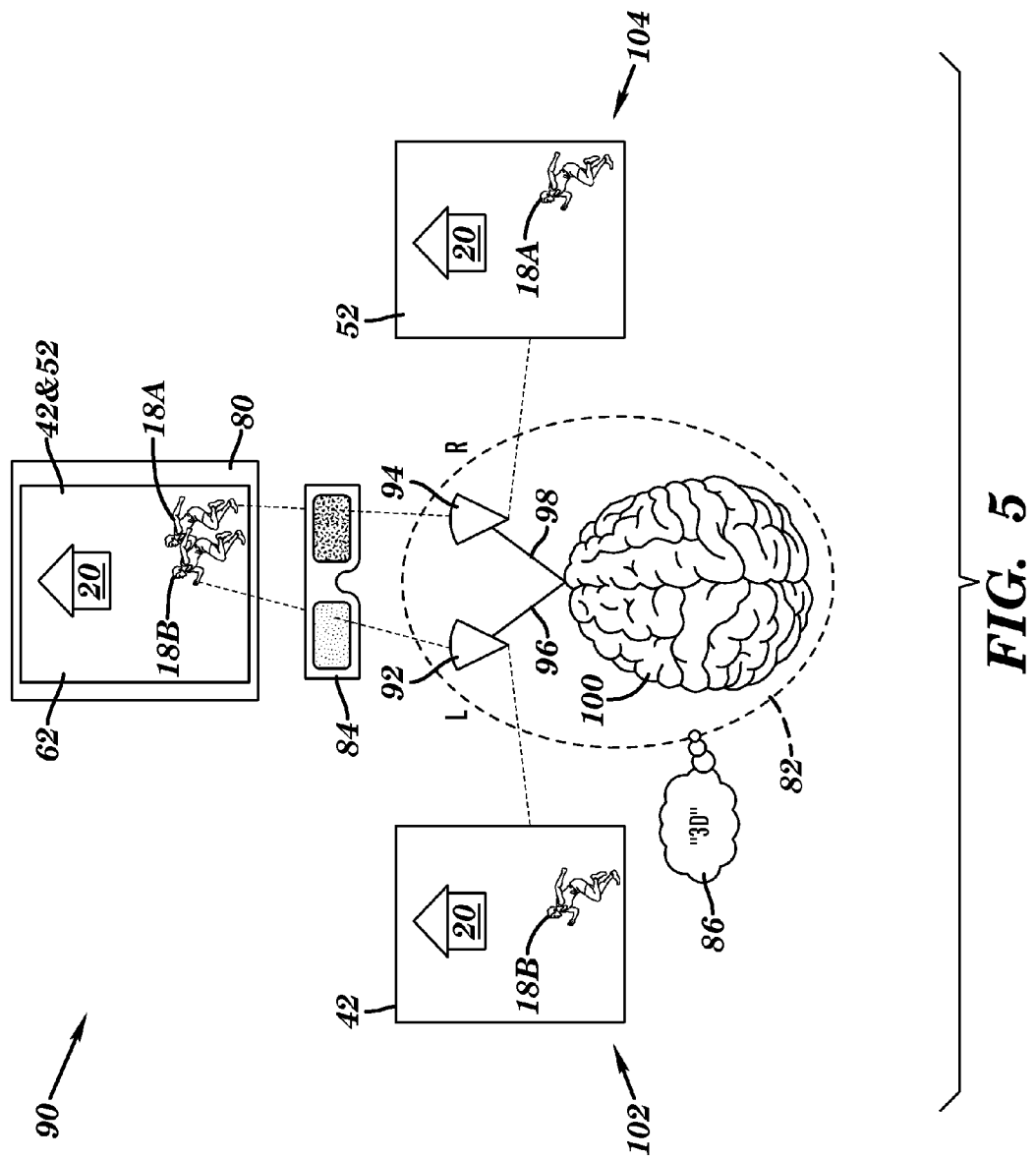
FIG. 5 is schematic illustration of the neuropsychological interpretation of stereoscopic images as shown in FIGS. 3 and 4 according to one aspect of the present invention.

FIG. 5 is schematic illustration 90 of one neuropsychological interpretation of the stereoscopic images shown in FIGS. 3 and 4 according to one aspect of the present invention. Though the reference numbers used in FIG. 5 correspond to the aspect where the images are advanced as shown and described with respect to FIG. 3, the following discussion of FIG. 5 also applies to the interpretation of the aspect of the invention where the images are delayed as shown and described with respect to FIG. 4.

As shown in FIG. 5, according to aspects of the invention, the displayed or combined series of images 61 or 161 may be rapidly displayed on a display or monitor 80 and viewed by observer 82, for example, a human observer, by means of a stereoscopic image-handling device 84, such as, a pair of "3-D" glasses. As schematically shown in FIG. 5, as observer 82 views monitor 80 with a left (L) eye 92 and a right (R) eye 94, optical impulses from eyes 92 and 94 are transmitted by respective optic nerves 96 and 98 and the image is perceived as stereoscopic images or stereoscopic video 86 by the observer's brain 100.

As discussed above under the heading "The Pulfrich Effect," the inventor recognized that the stereoscopic effect created by the different visual filters of the Pulfrich Effect can effectively be mimicked by generated images with subject displacement, for example, small subject displacement, that when viewed appropriately are interpreted by the human brain as stereoscopic, that is, where subjects or objects that appear in the foreground or in the background of other subjects or objects depending upon the relative motion and delay or advancement of the images. The schematic illustration 90 in FIG. 5 illustrates the mimicking of the Pulfrich Effect, among other aspects of the invention.

As shown in FIG. 5, display 80 displays the series of displayed images 61/161, which are viewed by the observer 82 through 3-D glasses 84. As discussed above, images 61/161 are comprised of displayed (that is, substantially simultaneously displayed) images or combined images, for example, image 62 comprising a combination of images 42 and 52, etc. As shown on display 80, image 42 contributes subject 18A (for example, the subject detected by the right eye 94) and image 52 contributes image 18B (for example, the subject detected by the left eye 92) to image 62. As discussed above, image 18B is displaced from image 18A due to the motion, for example, lateral motion, of subject 18 during the capturing of image 42 and image 52 (that is, image 44). According to an aspect of the invention, due to the presence of the glasses 84, one eye, for example, left eye 92, senses subject 18B, as indicated by image 102, and the other eye, for example, the right eye 94, senses the subject 18A, as indicated by image 104. However, according to what is understood as the neuropsychological effect of exposing the human brain 100 to two displaced images 18A and 18B, the brain 100 interprets the sensed images in 3-D as indicated by ideation 86. As also shown on monitor 80, since the structure, object, background, or backdrop 20 typically exhibits little or no displaced image, according to an aspect of the invention, the human brain may associate little or no 3-D effect to the structure, object, background, or backdrop 20.

According to aspects of the invention, subjects, for example, subjects 18A and 18B in FIG. 5, exhibiting larger displacements between images, for example, those subjects or objects moving relatively faster, may appear closer or in the foreground of the 3-D image 86 perceived by observer 82. Conversely, subjects or objects exhibiting smaller displacements between images, for example, relatively slower moving subjects or objects, may appear further away or in the background of the 3-D image 86 perceived by observer 82. In addition, according to aspects of the invention, immobile or stationery objects, such as structure 20, may appear the furthest away or in the far background of the 3-D image 86 perceived by observer 82. Accordingly, according to another aspect of the invention, by regulating or controlling the delay or advancement of the images in aspects of the invention, the relative position of the subjects, 18, and objects, 20, in the 3-D image 86 perceived by the observer 82 can be varied and, for example, the stereoscopic image can be modified or enhanced by varying the amount of delay or advancement of the images.

In FIGS. 3, 4, and 5, the motion of the subject 18, 18A, 18B, etc. is from right to left in the field of view. Accordingly, whether the images are delayed or advanced, the left eye 92 of the observer 82 receives the image of the later location 18B of the subject 18 and the right eye 94 of the observer 82 receives the image from the earlier location 18A of the subject 18. According to aspects of the invention, the relative displacement of the images seen by each eye will result in the desired stereoscopic imagery. However, it is envisioned that when the motion of the subject 18 is from left to right, that is, in the direction opposite the motion depicted in FIGS. 3, 4, and 5, the left eye 92 of the observer 82 receives the image of the earlier location of the subject 18 and the right eye 94 of the observer 82 receives the image from the later location of the subject. Again, according to aspects of the invention, this relative displacement will be perceived as the desired stereoscopic imagery.

It is also envisioned that, according to one aspect, more than one series of images may be generated in a fashion similar to the second series 51 and/or 151 of temporally modified images, for example, 2 or more series 51 and/or 151 of images, or 3 or more series 51 and/or 151 of images, may be generated and then displayed or combined with series 41 of images according aspects of the invention. For example, 2 or more series 51 and/or 151 may be generated having delays and/or advancements, as described herein, and/or varying delays and/or advancements, which when displayed or combined provide a motion picture that can be viewed stereoscopically. It is envisioned that the number of series of temporally modified images that can be generated and displayed or combined with series 41 is only limited by the clarity of the resulting display of images.

Figure 6:
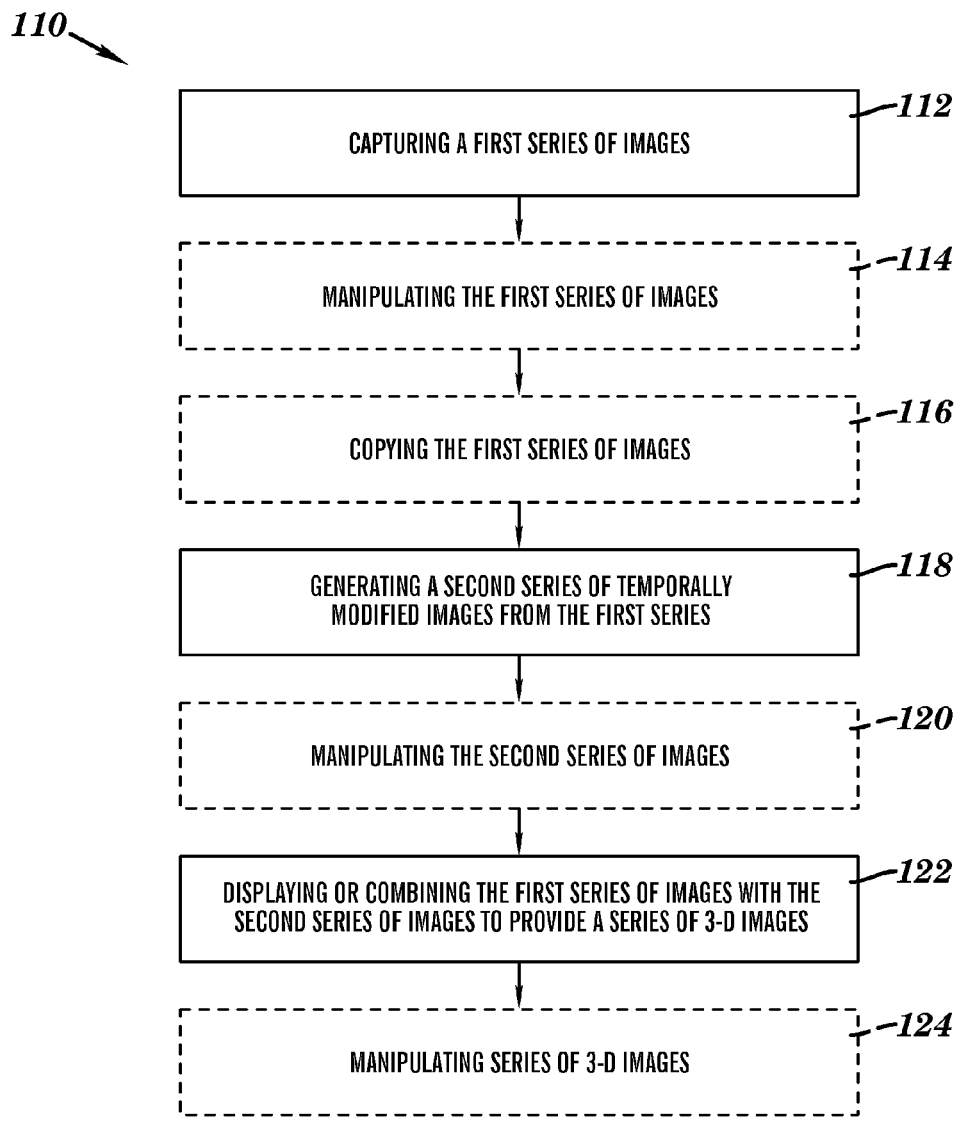
FIG. 6 is a schematic flow chart illustrating methods for practicing aspects of the present invention.

FIG. 6 is a schematic flow chart 110 illustrating one or more methods for practicing aspects of the present invention. As shown in FIG. 6, the present invention may be initiated by first capturing 112 a first series of images. This step substantially corresponds to the capture of the series 41 of images shown in FIGS. 3 and 4. Capturing 112 may be practiced by any device adapted to capture images, for example, digital images and/or analog images. For example, in on aspect, as shown in FIG. 1, the images may be captured by an image-capturing device 12, for example, a camera, such as, a digital camera, an analog or film-based camera, a video camera, a television camera; a mobile phone; or a computer, such as, a handheld computer, a tablet computer (for example, an Apple iPad™ tablet computer), or a laptop computer; among other devices. Image-capturing device 12 may typically include some form of image storage capacity, that is, some means for storing the captured images, for example, on digital storage media, such as, a hard disk drive, flash memory, compact disk (CD), optical disc, such as, digital video disk (DVD), and the like; or film.

As shown in phantom in FIG. 6, aspects of the invention may optionally also include the step of manipulating 114 the first series 41 of images, for example, to modify or enhance the appearance of the first series 41 of images. According to aspects of the invention, the images may be manipulated by non-linear video editing and/or digital video processing, among other techniques.

Image-capturing device 12 may also be adapted to transmit the captured images to a device adapted to manipulate the captured images, for example, a computer or other device containing image storage and/or image manipulation algorithms or devices, or device 12 may include means for storing and/or manipulating the captured images. The transmission from device 12 may be a wired transmission, for example, via a dedicated communications cable, or wirelessly, for example, via a wireless network.

With or without manipulating 114, after capturing 112 the images, at least some of the first series of images captured may be copied 116, as shown in phantom in FIG. 6, to produce a copied first series of images. According to this aspect of the invention, the copied series of images may be used as the series of images modified to generate the second series of images or the series of images used for the series of images combined with at least some of the temporally modified second series of images to provide the displayed stereoscopic series of images, such as, series 61 or 161 in FIGS. 3 and 4, respectively.

After capturing 112 and/or manipulating 114 and/or copying 116, a second series of images may be generated 118 from the first series of images. Again, with reference to FIGS. 3 and 4, this may be exemplified by the generation of series 51 or series 151, respectively, generated from captured series 41. This generation of the second series of images, for example, as described with respect to FIGS. 3 and 4, may be practiced by advancing or delaying the images in the series by 1, 2 or 3 or more frames, as discussed above. This generation of the second series of images may be practiced by any conventional means, but is typically practiced by digitally manipulating digital images, for example, by means of appropriate software, for example, Final Cut Pro software provided by Apple Inc., Media Composer software provided by Avid Technology, Inc., or Premier Pro software provided by Adobe Systems Inc., or their equivalents.

As shown in FIG. 6, after generating 118 the second series of images, the second series of images, such as, series 51 or 151, may optionally be manipulated or enhanced 120 to, for example, modify or enhance the appearance or appropriateness of the second series of images. According to aspects of the invention, the second series of images may be manipulated 120 by one or more of non-linear video editing and/or digital video processing, among other techniques.

With or without manipulating or enhancing 120 of the second series, as shown in FIG. 6, in one aspect, the first series of images, for example, series 41 or a copy of series 41, may be displayed or combined 122 with the temporally modified second series of images, for example, series 51, 151, or a copy of series 51 or 151, to provide a stereoscopic series of images, for example, series 61 or 161.

When the images are combined, the combining of these series may be practiced as described previously and may be performed by any conventional means of combining images, for example, digital or analog image manipulation software.

When the images are displayed, the displaying of the images may be practiced by any conventional means for displaying the series of stereoscopic images generated for viewing by a human observer. Specifically, the means for displaying the series of stereoscopic images may comprise means for display two series of images: a first series of images to be sensed by one eye, and a second series of images sensed by the other eye. For example, displaying may comprise displaying the series of images wherein the images may be viewed by means of an appropriate stereoscopic viewing device, such as, "3-D" glasses, for example, glasses having different colored filters over each eye. For instance, the viewing device may comprise glasses having a red colored filter over one eye and a cyan colored filter over the other eye. In another aspect, the stereoscopic viewing device may be a device having two filters of different polarization adapted to transmit different light of different polarization. For example, a pair of glasses having one lens having a first polarization and a second lens having a second polarization different from the first polarization, for instance, a polarization that is 90 degrees from the first polarization. In this aspect, the images created by aspects of the invention may be passed through corresponding polarization filters that allow the image to pass through the respective polarizing filter worn by the observer. In another aspect, the images may be displayed or projected in an alternating right eye/left eye fashion and the observer may view the images through a device, for example, headset, having shutters adapted to alternately open and close, for example, rapidly open and close, to alternate the images received by the left and right eye. In a still further aspect of the invention, the images produced by aspects of the invention may be displayed on what is referred to as an "auto-stereoscopic" screen having a lenticular lens system that isolates the left- and right-eye images to provide a stereoscopic effect.

The typical displaying 122 for viewing is shown schematically in FIG. 5. Displaying 126 may be practiced by displaying the images on a monitor, for example, a computer monitor, a stand-alone monitor, or a television screen, or by projecting the images on an appropriate surface, for example, a screen or a wall. In one aspect, the stereoscopic viewing device may be a pair of video glasses, for example, video glasses having two monitors adapted to display different images to each eye. One type of video glasses is provided by SaferWholesale.com and is marketed under the name "50 Virtual Video Glasses," though other types of video glasses may be used.

As also shown in FIG. 6, aspects of the invention may also include enhancing 124 the generated series of stereoscopic images, for example, to enhance the stereoscopic effect or to combine the stereoscopic images generated with other images, for example, stereoscopic or non-stereoscopic (for example, monocular) images, to enhance the viewing experience. Practices that can be used to enhance the experience of viewing the stereoscopic images include, but are not limited to, enhancement with computer graphic imagery (CGI), for example, by introducing effects or images, such as, alternate backdrops or backgrounds (2-D and/or 3-D backgrounds), additional subjects, or precipitation (for example, snow, rain, or fog). In another aspect, the 3-D images produced by combining 122 may be manipulated using some form of composting or layering technique based upon color, for example, what is known in the art as "chroma keying." Specific techniques for chroma keying are referred to as "blue screen" or "green screen" in the art. In one aspect, chroma keying may be used to vary the delay or advancement of subjects 138 and/or structures or backgrounds 140, for instance, to vary the stereoscopic image of the foreground, the background, the subjects, or a combination thereof.

Figure 7:
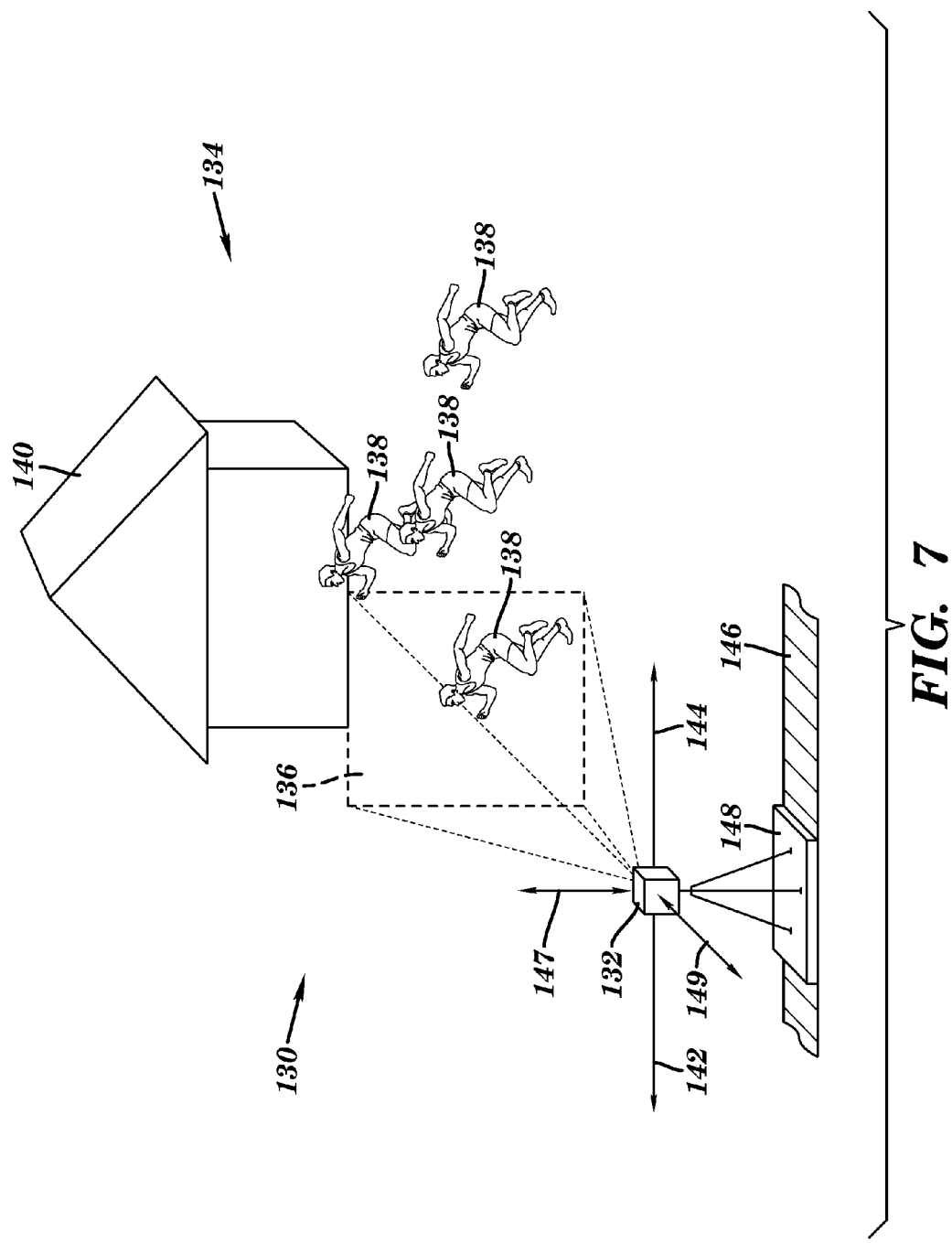
FIG. 7 is a schematic illustration, similar to FIG. 1, of an arrangement for practicing another aspect of the present invention.

FIG. 7 is a schematic illustration, similar to FIG. 1, of an arrangement 130 for practicing another aspect of the present invention. According the aspect of the invention shown in FIG. 7, the practice of capturing the images, for example, using image-capturing device 132 in FIG. 7, for example, a camera similar to device 12 shown in FIG. 1, is adapted to enhance the resulting stereoscopic images produced. In a fashion similar to FIG. 1, the arrangement 130 in FIG. 7 includes an image-capturing device 132, for example, a video camera, adapted to record a series of images of a scene 134, where the image-capturing device 132 defines a field of view 136. The scene 134 in the field of view 136 may typically have one or more subjects 138 which may be in motion, for example, sprinters, and may include one or more structures, backgrounds, objects, or backdrops 140, for example, a building, as shown, or a landscape, positioned behind or distal the subjects 138, for example, distal to image-capturing device 132.

As discussed above, according to aspects of the invention, stereoscope images (that is, "3-D" images) can be provided by appropriately manipulating the images captured by an image-capturing device 132, for example, a single image-capturing device, such as, a video camera. As discussed above, the degree or quality of the stereoscopic images generated can be affected by the quality of the images captured by, for example, image-capturing device 132, but also by the degree of relative motion of subjects 138 relative to device 132 and the relationship of subjects 132 to structures or backdrop 140. For example, according to aspects of the invention, objects/subjects exhibiting a greater change in relative position, for example, faster moving objects/subjects, may appear closer to the viewer or in the foreground when displayed and viewed stereoscopically; objects/subjects exhibiting less change in relative position, for example, slower moving objects/subjects, may appear further away from the viewer or in the background when displayed and viewed stereoscopically; and non-moving or stationery objects/subjects/backdrops may appear furthest away from the viewer or in the far background when displayed and viewed stereoscopically. According to one aspect of the invention, which will be described with respect to FIG. 7, the degree of stereoscopic imagery and/or the quality of the stereoscopic images can be enhanced by how the images are captured, that is, the technique of capturing the images, for example, with image-capturing device 132.

According to aspects of the invention, the relative motion and/or position of the image capturing device 132 and/or the subject 138 can be varied to enhance the stereoscopic images produced by aspects of the invention. That is, in one aspect of the invention, varying a position of a moveable image-capturing device 132 relative to the subject 138 can be practiced to vary at least some stereoscopic appearance of the series of stereoscopic images. Varying the position of the image-capturing device 132 relative to the subject 138 may be practiced by varying the position of the image-capturing device 132, varying the position of the subject 138, or varying the position of the image-capturing device 132 and of the subject 138. For instance, relative movement can be characterized by 1) a fixed image-capturing device 132 and a moving subject 138; 2) a moving image capturing device 132 and a fixed subject 138; 3) a moving image-capturing device 132 and a moving subject 138. As shown in FIG. 7, the subject 138 may be moving, as shown by the sprinters, or stationary, relative to the image-capturing device 132, and the subject 140, for example, a structure, may typically be stationary relative to the image-capturing device 132. Also, image-capturing device 132 may be stationary or be moving, for example, laterally translating as indicated by arrows 142, 144, for example, mounted for movement along a track 146, for example, on a dolly 148, or a boom (not shown). Also, image-capturing device 132 may be moved vertically, as indicated by double arrow 147, for example, by means of a boom (not shown), and/or forward and backward, as in indicated by double arrow 149, for example, by means of a track (not shown) and a dolly 148 or a boom (not shown).

In one aspect of the invention, varying the relative movement and/or position between the image-capturing device 132 and the subject 138 may enhance the stereoscopic effect. For example, when the image-capturing device 132 is in motion, for example, manually moved or on a dolly 148 moving along track 146, by moving the subject 138 closer to device 132, the displacement of the subject 138 relative to the stationary structure or backdrop 140 will be enhanced when viewed stereoscopically. Accordingly, during image capture and manipulation, the displacement between successive images may be larger (for example, larger than were a stationary image capturing device 132 used) and, therefore, enhancing the stereoscopic effect. According to aspects of the invention, with any motion of the image-capturing device 132, moving the subject 138 closer to device 132 can enhance the stereoscopic effect. Conversely, with any motion of the image-capturing device 132, the stereoscopic effect can be modified or minimized by moving subject 138 away from device 132. The inventor recognizes that the stereoscopic effect can be varied by any transverse motion, as shown by arrows 142 and 144; by any vertical motion, as indicated by double arrow 147; and/or any forward and backward motion, as indicated by double arrow 149, and any combination thereof. However, it is envisioned that the enhancement or reduction of the stereoscopic effect may be best practiced by transverse motion of image-capturing device 132, as indicted by arrows 142 and 144. In one aspect of the invention, for example, transverse movement, may be practiced manually, for example, by a hand-held video camera, and aspects of the invention may employ camera stabilizing devices or systems, for example, a Steadicam® camera stabilizing system provided by the Tiffen Company of Hauppauge, N.Y., though other stabilization systems may be used.

In addition, aspects of the present invention may detect relative positioning or movement of the image-capturing device 132, one or more subjects 138, or both that can be used as a basis for varying the delay and/or advancement of images according to aspects of the invention. For example, in one aspect, with respect to FIG. 7, one or more image-capturing devices 132, for instance, a video camera, may contain one or more sensors, for example, accelerometers or global positioning sensors (GPS), adapted to monitor the location and/or speed of image-capturing device 132, for example, with respect to the position or speed of subject 138, and aspects of the invention may vary the delay and/or advancement of frames as a function of the speed and/or position detected, for example, to enhance or optimize the stereoscopic effect. In another aspect, one or more subjects 138 may be fitted with one or more sensors, for example, accelerometers or global positioning sensors (GPS), adapted to monitor the location and/or speed of subject 138, for example, with respect to the position or speed of device 132, and aspects of the invention may vary the delay and/or advancement of frames as a function of the speed and/or position detected, for example, to enhance or optimize the stereoscopic effect. In another aspect, the location and speed of one or more image capturing device 132 and the location and speed of one or more subjects 138 may be monitored and used as a basis for controlling or regulating the delay and/or advancement of frames. In another aspect, the location and/or speed of image-capturing device 132 and/or subject 138 may be detected remotely, for example, by a sensor adapted to detect the location and/or speed of image-capturing device 132 and/or subject 138, for instance, using radar.

Though in one aspect this detection of location and/or speed may be detected and used to immediately regulate the delay and/or advancement of frames, for example, in "real time," in other aspects, the location and/or speed data may be recorded and used in later post-processing of the image data, as disclosed herein, to generate the desired stereoscopic images for subsequent display and viewing.

In a further aspect of the invention, the delay and/or advancement of portions of images may also be varied to vary the resulting stereoscopic appearance of one or more portions of an image. For example, the stereoscopic appearance of one or more portions of a series of images may be controlled or varied depending upon the degree of stereoscopic effect desired in a series of images. For instance, when two or more subjects 138 or two or more structures or backdrops 140 may be present in images in a series of images, the delay or advancement of portions of the images associated with each of the two or more subjects 138 and/or each of the two or more structures or backdrops 140 may be varied or controlled to vary or control the stereoscopic appearance of each of the two or more subjects 138 and/or each of the two or more structures or backdrops 140. In addition, the location and/or speed of each of the two or more subjects 138 and/or each of the two or more structures or backdrops 140 may be monitored, for example, via appropriate sensors, and then the delay or advancement of each of the two or more subjects 138 and/or each of the two or more structures or backdrops 140 can be regulated, controlled, or varied as a function of their location and speed, for example, their relative location and speed.

In a related aspect of the invention, due to the rapid and discontinuous motion that characterizes the movement of the human mouth during speech, in one aspect, the delay or advancement of frames that characterize aspects of the present invention may exclude the portion of the images at and about the region of the mouth. For example, in one aspect, the portion of one image at and about the mouth in, for example, series 41 of images or series 51 of images, may be omitted from one of the series of images (for example, series 51) so that the portion of the image in and about the region of the mouth of the other series of images (for example, series 41) appears when the series 41 and 51 are displayed. In another example of an aspect of the invention, the delay or advancement of the portions of the images or frames, for example, in series 41, may be limited to the overall face and the body of a subject 138, but the portion of the subject 138 in and about the mouth of a speaking subject may be manipulated by other means, for example, by means of motion tracking software or related software. In one aspect, the motion tracking software may be After Effects software provided by Adobe or Motion software provided by Apple, or their equivalent.

As outlined in detail above, aspects of the present invention provide systems and methods for producing stereoscopically viewable images, for example, motion pictures, from 2-dimensional images, for example, 2-dimensional motion pictures. In addition to distinguishing from prior art systems and methods, aspects of the invention may provide distinct advantageous over the prior art. For example, aspects of the invention may be uniquely suited for immediate or real time generation of 3-D motion pictures, for example, for immediate transmission of 3-D images of real-time events.

As will be appreciated by those skilled in the art, features, characteristics, and/or advantages of the various aspects described herein, may be applied and/or extended to any embodiment (for example, applied and/or extended to any portion thereof).

Although numerous aspects of the present invention have been depicted and described in detail herein, it will be apparent to those skilled in the art that various modifications, additions, substitutions, and the like can be made without departing from the spirit of the invention and these are therefore considered to be within the scope of the invention as defined in the following claims.

The invention claimed is:

1. A method for synthesizing a series of stereoscopic images from a series of images, the series of images exhibiting at least some relative movement, the method comprising:
 capturing a series of images with a moveable image-capturing device, the series of images exhibiting at least some relative movement of a subject to provide a first series of images;
 generating a second series of temporally modified images of the subject from the first series of images by varying a relative timing of at least some of the images of the first series of images,
  wherein varying the relative timing comprises at least one of delaying the timing and advancing the timing; and
 displaying the first series of images and the second series of temporally modified images to produce a series of stereoscopic images having at least some stereoscopic appearance;
 wherein the method further comprises varying a position of the moveable image-capturing device relative to the subject, and wherein varying the position of the image capturing device varies the at least some stereoscopic appearance of the series of stereoscopic images.

2. The method as recited in claim 1, wherein displaying comprises rapidly displaying the first series of images and the second series of temporally modified images to produce a display of stereoscopic images wherein the display of stereoscopic images can be viewed by a human observer via a stereoscopic image-handling device.

3. A system for synthesizing a series of stereoscopic images from a series of images, the series of images exhibiting at least some relative movement, the system comprising:
- a movable image-capturing device adapted for capturing a series of images of a subject exhibiting at least some relative movement to provide a first series of images;
- means for generating a second series of temporally modified images of the subject from the first series of images by varying a relative timing of at least some of the images of the first series of images,
  - wherein varying the relative timing comprises at least one of delaying the timing and advancing the timing;
- a display adapted to display the first series of images and the second series of temporally modified images to display a series of stereoscopic images having at least some stereoscopic appearance; and
- a mechanism for varying a position of the moveable image-capturing device relative to the subject, wherein varying the position of the image capturing device varies the at least some stereoscopic appearance of the series of stereoscopic images.

4. The system as recited in claim 3, wherein the means for generating the second series of temporally modified images from the first series of images comprises a processor having a program adapted to vary the relative timing of at least some of the images of the first series of images.

5. The system as recited in claim 3, wherein the system further comprises a stereoscopic image-handling device adapted to allow viewing of the stereoscopic images on the display by a human observer.

6. The method as recited in claim 1, wherein varying the position of the moveable image-capturing device relative to the subject comprises at least one of moving the image-capturing device and moving the subject.

7. The system as recited in claim 3, wherein the mechanism for varying the position of the moveable image-capturing device relative to the subject comprises at least one of a mechanism for moving the image-capturing device and a mechanism for moving the subject.

8. The method as recited in claim 1, wherein varying the position of the moveable image-capturing device relative to the subject comprises moving the image-capturing device relative to the subject.

9. The system as recited in claim 3, wherein the mechanism for varying the position of the moveable image-capturing device relative to the subject comprises a mechanism for moving the image-capturing device relative to the subject.

\* \* \* \* \*